US012580710B2

(12) United States Patent　　(10) Patent No.: US 12,580,710 B2
Liu et al.　　(45) Date of Patent: Mar. 17, 2026

(54) METHOD AND APPARATUS FOR RESOURCE ALLOCATION

(71) Applicant: LENOVO (BEIJING) LIMITED, Beijing (CN)

(72) Inventors: Hongmei Liu, Beijing (CN); Zhi Yan, Beijing (CN); Yuantao Zhang, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 269 days.

(21) Appl. No.: 18/260,119

(22) PCT Filed: Dec. 30, 2020

(86) PCT No.: PCT/CN2020/141396
§ 371 (c)(1),
(2) Date: Jun. 30, 2023

(87) PCT Pub. No.: WO2022/141195
PCT Pub. Date: Jul. 7, 2022

(65) Prior Publication Data
US 2024/0063971 A1　　Feb. 22, 2024

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 2015/0181589 A1* | 6/2015 | Luo | ......................... | H04L 5/001 |
| | | | | 370/329 |
| 2020/0337056 A1* | 10/2020 | Abedini | ............... | H04B 17/336 |
| 2021/0044404 A1* | 2/2021 | Liu | ...................... | H04B 7/0697 |

(Continued)

FOREIGN PATENT DOCUMENTS

| | | |
|---|---|---|
| EP | 3846532 A1 | 7/2021 |
| WO | 2020029163 A1 | 2/2020 |
| WO | 2020063959 A1 | 4/2020 |

(Continued)

OTHER PUBLICATIONS

International Searching Authority, "Written Opinion of the International Searching Authority," PCT/CN2020/141396, Sep. 28, 2021, pp. 1-4.

(Continued)

*Primary Examiner* — Diane L Lo

(74) *Attorney, Agent, or Firm* — Kunzler Needham & Hilton

(57)　　ABSTRACT

Embodiments of the present application are related to a method and apparatus for resource allocation. An exemplary method of the present application includes: receiving, from a first node, at least one signaling indicating at least one of first spatial domain filter configuration information and first demodulation reference signal (DMRS) configuration information for a first link of a second node, and receiving or transmitting data on a second link of the second node, wherein the first link is the same as or different from the second link.

19 Claims, 4 Drawing Sheets

201
receiving, from a first node, at least one signaling indicating at least one of first spatial domain filter configuration information and first DMRS configuration information for a first link of a second node 203
receiving or transmitting data on a second link of the second node, wherein the first link is the same as or different from the second link

(56)             References Cited

U.S. PATENT DOCUMENTS

| | | | |
|---|---|---|---|
| 2021/0376898 A1* | 12/2021 | Levitsky | H04W 24/10 |
| 2021/0392514 A1* | 12/2021 | Matsumura | H04B 7/088 |

FOREIGN PATENT DOCUMENTS

| | | |
|---|---|---|
| WO | 2020093361 A1 | 5/2020 |
| WO | 2020139176 A1 | 7/2020 |
| WO | 2020186401 A1 | 9/2020 |

OTHER PUBLICATIONS

Zte et al., "Discussion on physical layer enhancements for NR IAB", 3GPP TSG RAN WG1 Meeting #95 R1-1812729, Nov. 12-16, 2018, pp. 1-9.
Huawei et al., "Codebook Design for rank 2 for 2D antenna arrays", 3GPP TSG RAN WG1 Meeting #83 R1-157526, Nov. 15-22, 2015, pp. 1-10.

* cited by examiner

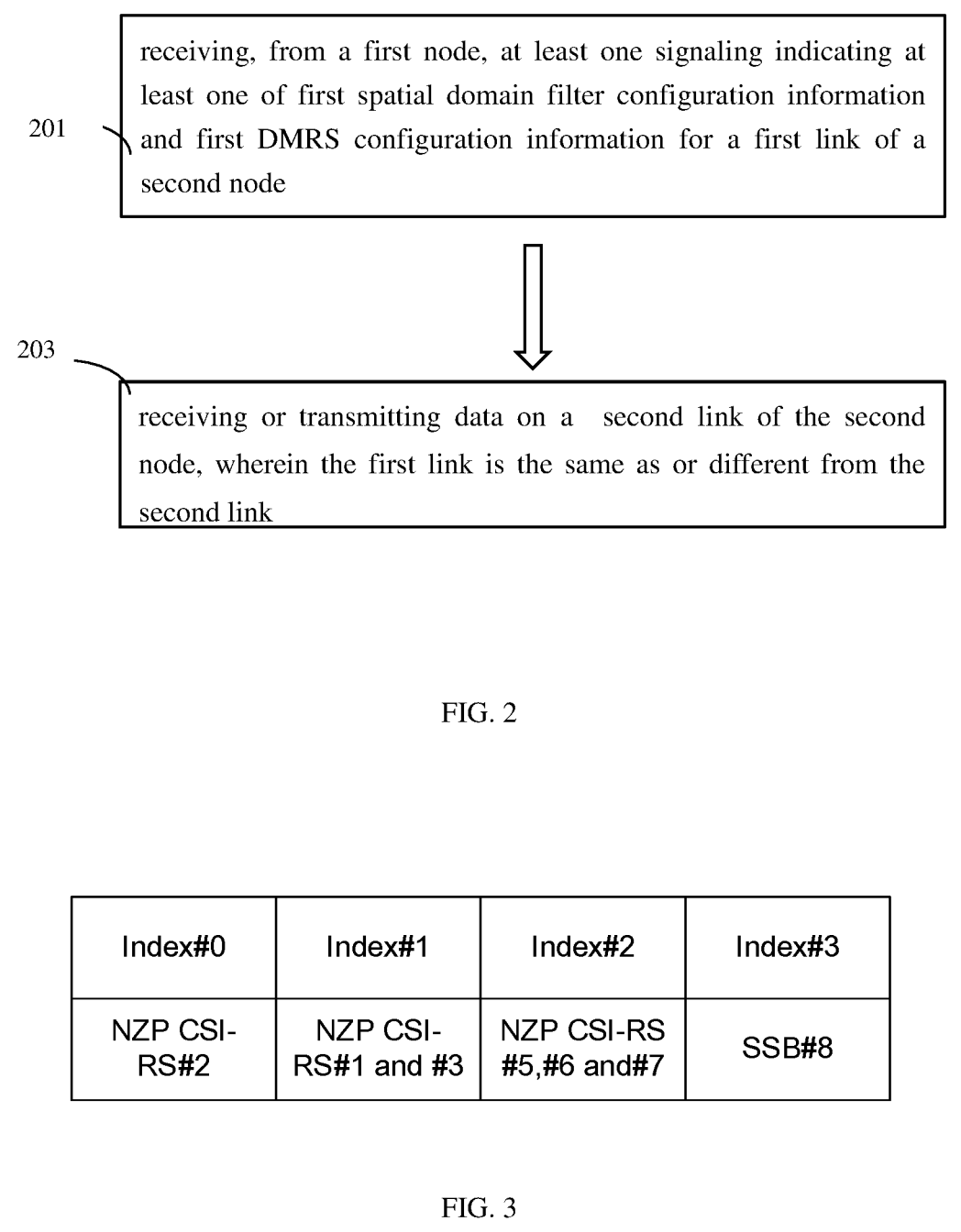

201 — receiving, from a first node, at least one signaling indicating at least one of first spatial domain filter configuration information and first DMRS configuration information for a first link of a second node 203 — receiving or transmitting data on a second link of the second node, wherein the first link is the same as or different from the second link

FIG. 2

| Index#0 | Index#1 | Index#2 | Index#3 |
|---------|---------|---------|---------|
| NZP CSI-RS#2 | NZP CSI-RS#1 and #3 | NZP CSI-RS #5,#6 and#7 | SSB#8 |

FIG. 3

501 —
transmitting from a first node, at least one signaling indicating at least one of first spatial domain filter configuration information and first DMRS configuration information for a first link of a second node 503 —
transmitting or receiving data on a second link of the second node, wherein the first link is the same as or different from the second link

FIG. 5

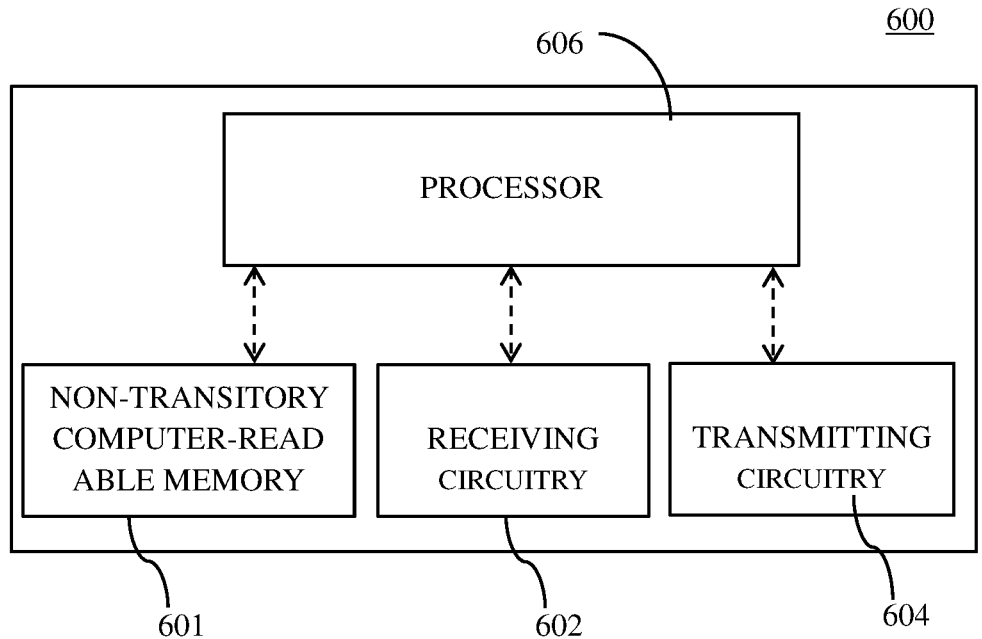

600

606 — PROCESSOR

601 NON-TRANSITORY COMPUTER-READABLE MEMORY

602 RECEIVING CIRCUITRY

604 TRANSMITTING CIRCUITRY

FIG. 6

METHOD AND APPARATUS FOR RESOURCE ALLOCATION

TECHNICAL FIELD

Embodiments of the present application relate to wireless communication technology, especially to a method and apparatus for resource allocation, e.g., in an integrated access and backhaul (IAB) network.

BACKGROUND

In the 3rd generation partnership project (3GPP), deployment of relay nodes (RNs) in a wireless communication system is promoted. One objective for deploying RNs is to enhance coverage area of a base station (BS, also referred to as eNB in 4G networks or gNB in 5G networks) by improving the throughput of a mobile device (also known as a user equipment (UE)) that locates in a coverage hole or far from the BS, which can result in relatively low signal quality.

In a wireless communication system which employs RNs, a BS that can provide connections to at least one RN is called a donor BS (or a donor node or a donor). An RN is connected to a donor BS by a backhaul link. The RN may hop through one or more RNs before reaching the donor BS, or may be directly connected to the donor BS. For the new radio (NR) communication networks, 3GPP is envisioning an IAB architecture for supporting multi-hop relays, wherein a donor node with multi-connectivity is also supported by an IAB node. That is, the IAB node has a plurality of active routes to the donor BS via multiple parent IAB nodes (also called "serving IAB nodes").

According to an IAB work item description (WID) in R17, space division multiplexing (SDM) between an IAB node's parent link and child link is supported. For example, the resource allocation, e.g., spatial domain filter allocation, demodulation reference signal (DMRS) allocation etc. in the parent link of an IAB node has an impact on the resource allocation on the child link of the IAB node. All the research topics under SDM in an IAB architecture should be studied and solved.

SUMMARY OF THE APPLICATION

Embodiments of the present application provide a method and apparatus for resource allocation, which is at least adaptive to a scenario under SDM in an IAB network.

According to some embodiments of the present application, an exemplary method may include: receiving, from a first node, at least one signaling indicating at least one of first spatial domain filter configuration information and first DMRS configuration information for a first link of a second node, and receiving or transmitting data on a second link of the second node, wherein the first link is the same as or different from the second link.

According to some other embodiments of the present application, another exemplary method may include: transmitting from a first node, at least one signaling indicating at least one of first spatial domain filter configuration information and first DMRS configuration information for a first link of a second node, and transmitting or receiving data on a second link of the second node, wherein the first link is the same as or different from the second link.

In some embodiments of the present application, the at least one signaling is at least one of: group common downlink link control (DCI), or semi-static signaling(s). The first DMRS configuration information includes at least one of DMRS code division multiplexing (CDM) group, at least one DMRS port index, and a number of frontloaded DMRS symbols. According to some embodiments of the present application, the DMRS CDM group is associated with downlink DMRS or uplink DMRS. From the second node's perspective, the first link or the second link may be a link between the first node and the second node in some embodiments of the present application, while the first link or the second link may be a link between the second node and a third node different from the first node in some other embodiments of the present application. However, from the first node's perspective, the first link may be a link between the first node and the second node in some embodiments of the present application or a link between the second node and the third node different from the first node, the second link may be a link between the first node and the second node in some embodiments of the present application, but the second link cannot be a link between the second node and the third node different from the first node.

In some embodiments of the present application, when the first link is different from the second link, the method includes at least one of: determining second spatial domain filter configuration information for the second link of the second node based on the first spatial domain filter configuration information; and determining second DMRS configuration information for the second link based on the first DMRS configuration information.

In some embodiments of the present application, the first spatial domain filter configuration information includes at least one of channel state information-reference signal (CSI-RS) resource index, synchronization signal block (SSB) index and sounding reference signal (SRS) resource index. In some other embodiments of the present application, the first spatial domain filter configuration information includes a first precoding matrix indicator (PMI) index subset including one or more PMI index. According to some embodiments of the present application, the first PMI index subset is selected from a PMI set. The PMI set may be predefined, or may be configured by a resource control (RRC) signaling or medium access control (MAC) control element (CE).

In some embodiments of the present application, the at least one of first spatial domain filter configuration information and first DMRS configuration information is configured per carrier component (CC) or per bandwidth part (BWP).

In some embodiments of the present application, the at least one of first spatial domain filter configuration information and first DMRS configuration information is for at least one time domain resource, wherein the time domain granularity of the time domain resource or the at least one time domain resource is predefined or configured by a RRC signaling or a MAC CE. A unit of the time domain granularity or a unit of the time domain resource is an absolute value in some embodiments of the present application, while a unit of the time domain granularity or a unit of the time domain resource is a slot or a symbol with respect to a subcarrier spacing (SCS) in some other embodiments. The SCS is configured by a RRC signaling or a MAC CE, and is determined by bandwidth part (BWP) configuration when the at least one signaling is received.

Some embodiments of the present application also provide an apparatus, including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for resource allocation, especially a method and apparatus under SDM in an IAB architecture, and thus can facilitate and improve the implementation of 5G NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 2 illustrates an exemplary flow chart of a method for resource allocation according to some embodiments of the present application;

FIG. 3 illustrates an exemplary mapping between index and spatial domain filter (or RS index or RS index set) according to some embodiments of the present application;

FIG. 5 illustrates an exemplary flow chart of a method for resource allocation according to some embodiments of the present application; and FIG. 6 illustrates an exemplary block diagram of an apparatus according to some embodiments of the present application.

DETAILED DESCRIPTION

The detailed description of the appended drawings is intended as a description of the currently preferred embodiments of the present application and is not intended to represent the only forms in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1A:
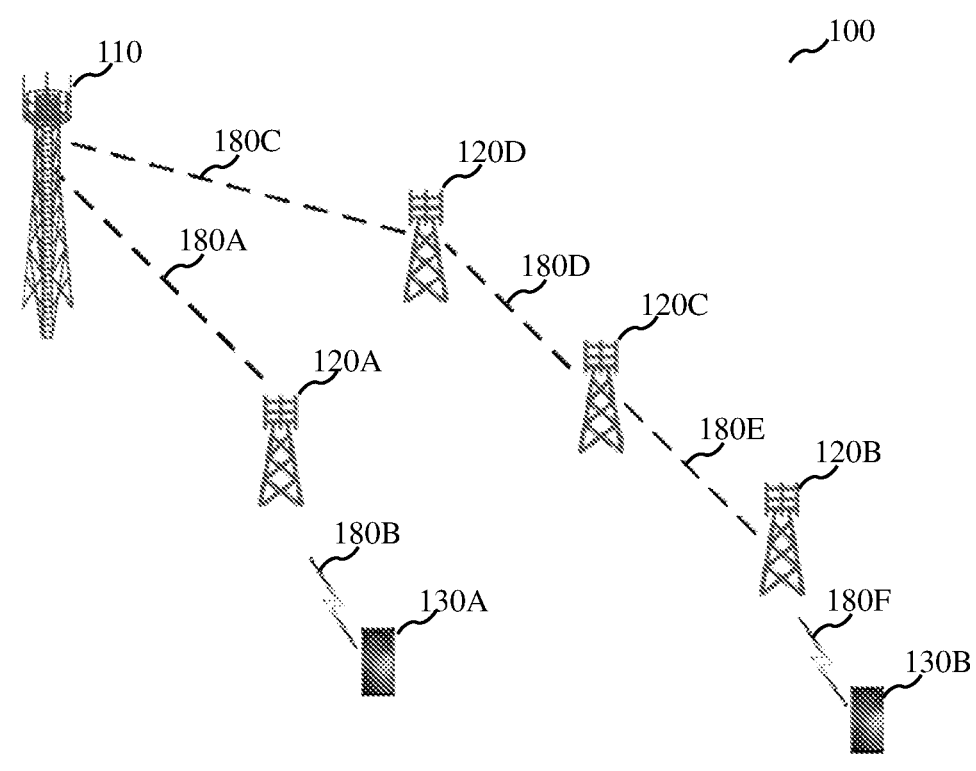
FIG. 1A illustrates an exemplary IAB system according to some embodiments of the present application.

FIG. 1A illustrates an exemplary IAB system 100 according to some embodiments of the present application.

Referring to FIG. 1A, the IAB system 100 can include an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 1A, it is contemplated that IAB system 100 may include more donor node(s) in some other embodiments of the present application. Similarly, although merely four IAB nodes are illustrated in FIG. 1A for simplicity, it is contemplated that IAB system 100 may include more or fewer IAB nodes in some other embodiments of the present application. Although merely two UEs are illustrated in FIG. 1A for simplicity, it is contemplated that IAB system 100 may include more or fewer UEs in some other embodiments of the present application.

IAB node 120A is directly connected to donor node 110. IAB node 120D is directly connected to donor node 110. In this example, donor node 110 is a parent node of IAB node 120A, and also a parent node of IAB node 120D. IAB nodes 120A and 120D are child nodes of donor node 110. Link 180A between donor node 110 and IAB node 120A is a parent link of IAB node 120A. Link 180C between donor node 110 and IAB node 120D is a parent link of IAB node 120D. IAB node 120A can be connected to donor node(s) other than donor node 110 in accordance with some other embodiments of the present application. IAB node 120D can be connected to donor node(s) other than donor node 110 in accordance with some other embodiments of the present application.

IAB node 120C can reach donor node 110 by hopping through IAB node 120D. IAB node 120D is a parent node of IAB node 120C, and IAB node 120C is a child node of IAB node 120D. Link 180D between IAB node 120D and IAB node 120C is a child link of IAB node 120D, and also a parent link of IAB node 120C.

IAB node 120B can reach donor node 110 by hopping through IAB node 120C and IAB node 120D. IAB node 120C and IAB node 120D are upstream nodes of IAB node 120B, and IAB node 120C is a parent node of IAB node 120B. In other words, IAB node 120B is a child node of IAB node 120C. IAB node 120B and IAB node 120C are downstream nodes of IAB node 120D. Link 180E between IAB node 120C and IAB node 120B is a child link of IAB node 120C, and also a parent link of IAB node 120B.

UE 130A is directly connected to IAB node 120A via link 180B, and UE 130B is directly connected to IAB node 120B via link 180F. In other words, UE 130A and UE 130B are served by IAB node 120A and IAB node 120B, respectively. In some other embodiments of the present application, UE 130A and UE 130B may also be referred to as child nodes of IAB node 120A and IAB node 120B, respectively. Link 180B is a child link of IAB node 120A. Link 180F is a child link of IAB node 120B.

Each of IAB node 120A, IAB node 120B, IAB node 120C, and IAB node 120D may be directly connected to one or more UEs in accordance with some other embodiments of the present application.

Each of IAB node 120A, IAB node 120B, IAB node 120C, and IAB node 120D may be directly connected to one or more IAB nodes in accordance with some other embodiments of the present application.

Figure 1B:
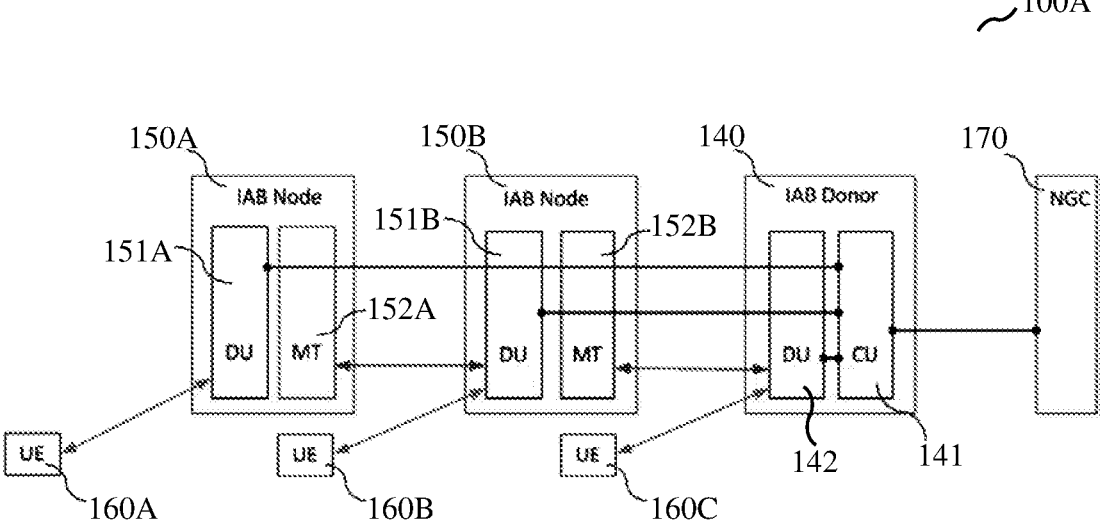
FIG. 1B illustrates an exemplary IAB system according to some other embodiments of the present application.

FIG. 1B illustrates an exemplary IAB system 100A according to some embodiments of the present application.

Referring to FIG. 1B, the IAB system 100A may include an IAB donor 140, IAB node 150A, IAB node 150B, UE 160A, UE 160B, UE 160C and a Next-Generation Core (NGC) 170.

Each of the IAB node 150A and IAB node 150B may include a distributed unit (DU) and a mobile termination (MT). In the context of this application, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs or a downstream IAB node via the DU. A UE can also be referred to as an IAB MT.

The IAB node 150A may be connected to an upstream IAB node (e.g., IAB node 150B) via MT 152A. IAB node 150A may be connected to UE 160A via DU 151A.

The IAB node 150B may be connected to an upstream IAB node or IAB donor 140 via MT 152B. IAB node 150B may be connected to UE 160B via DU 151B. IAB node 150B may be connected to a downstream IAB node (e.g., IAB node 150A) via DU 151B.

In some embodiments of the present application, the IAB nodes as shown in FIG. 1B may include Layer-2 (L2) IAB nodes.

Referring back to FIG. 1A, the IAB nodes (e.g., IAB node 120A, IAB node 120B, IAB node 120C, and IAB node 120D) may include L2 IAB nodes.

Referring to FIG. 1B, the BS (e.g., the IAB donor 140) may include at least one DU to support UEs and MTs of downstream IAB nodes. A centralized unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via an F1 interface. In other words, the F1 interface provides means for interconnecting the CU and the DU(s) of an IAB donor. The F1 application protocol (F1AP) supports the functions of F1 interface by certain F1AP signaling procedures.

In some embodiments of the present application, CU 141 of the IAB donor 140 is a logical node hosting radio resource control (RRC), service data adaptation protocol (SDAP) and packet data convergence protocol (PDCP) layers of the BS. The DU of the BS is a logical node hosting radio link control (RLC) layer, medium access control (MAC) layer and physical layer (PHY) of the BS. One cell is supported by only one DU of a BS or one DU of an IAB node.

According to an IAB WID for R17, the SDM between an IAB node's parent link and child link will be supported, which mainly concerns on: a) different spatial domain filter/precoding matrix indicator (PMI) pairs between the parent link and the child link have different impacts on system performance, e.g., the spatial domain filter allocation on the parent link has impact on the spatial domain filter allocation on the child link; and b) different DMRS ports are used for the parent link and the child link for simultaneous transmission or reception.

Regarding spatial domain filter allocation, there has been already a PDCCH spatial domain filter indication mechanism by MAC CE and PDSCH spatial domain filter indication mechanism by DCI from an IAB MT's perspective. However, whether there is PDCCH transmission is detected by blind decoding in the IAB MT, and PDSCH spatial domain information is indicated very dynamically. Thus, it is difficult for an IAB node to react to the dynamic indication and blind decoding to determine and allocate the child link spatial domain filter.

On the other hand, regarding DMRS allocation, DMRS CDM group and a number of frontloaded DMRS symbols (also referred to as "the maximum length of DMRS symbols") is configured dynamically in NR R15 and R16. That means the IAB node cannot perform dynamic scheduling on the child link and has to wait for the configuration information of its parent link.

Given the above, the resource allocation mechanism, including spatial domain filter allocation and DMRS allocation in an IAB network should be redesigned to support the SDM between the parent link and child link of an IAB node. Herein (through the specification), the terminology "spatial domain filter" may be represented by "beam," "spatial domain information," "spatial relation information" or "transmission configuration indication (TCI) state" etc. For example, a spatial domain filter or beam may be a reference signal (RS) resource in some scenarios.

FIG. 2 illustrates a flow chart of an exemplary method for resource allocation according to some embodiments of the present application. The illustrated method can be implemented in an IAB MT, e.g., the MT of the IAB node 120C or the UE 130A etc. In some other embodiments of the present application, the illustrated method can be implemented in an IAB DU, e.g., the DU of the IAB node 120C etc. Persons skilled in the art can understand that the method implemented by other apparatus with the like functions.

As shown in FIG. 2, in step 201, at least one signaling indicating at least one of first spatial domain filter configuration information and first DMRS configuration information for a first link of a second node is received from a first node, e.g., by the second node. In some embodiments of the present application, the first node may configure the first spatial domain filter configuration information and first DMRS configuration information for the first link of the second node. The first node may be a parent node (or the DU of the parent node) of the second node (or the MT of the second node). The first link of the second node may be a link between the first node and the second node or a link between the second node with a third node different from the first node. In some embodiments of the present application, the third node (or the MT of the third node) may be the child node (or the MT of the child node) of the second node. For example, as shown in FIG. 1B, the first node may be the IAB node 140 (or the DU 142 of the IAB node 140), the second node is the IAB node 150B (or the MT 152B of the IAB node 150B), and the third node is the IAB node 150A (or the MT 152A of the IAB node 150A).

Specifically, in an IAB network, the resource allocation on at least one of the parent link and the child link of an IAB node can be indicated from a parent IAB node of the IAB node, which can enable efficient the SDM between the parent link and the child link of the IAB node. For example, the parent node of an IAB node may configure the spatial domain filter configuration information and DMRS configuration information for the parent link of the IAB node. In this case, the parent node may transmit the resource allocation information for the parent link to the MT of the IAB node, including the spatial domain filter configuration information and DMRS configuration information for the parent link. In some other embodiments of the present application, the parent node of an IAB node may configure the spatial domain filter configuration information and DMRS configuration information for the child link of the IAB node. In this case, the parent node may transmit the resource allocation information for the child link to the DU of the IAB node, including the spatial domain filter configuration information and DMRS configuration information for the child link. In some yet other embodiments of the present application, the parent node may configure the spatial domain filter configuration information and DMRS configuration information for both the parent link and child link, and transmit to the MT and DU of the IAB node respectively.

In some embodiments of the present application, the at least one signaling is at least one of: group common DCI, or semi-static signaling(s). The semi-static signaling(s) may be RRC signaling, MAC CE or other semi-static signaling(s). For example, the at least one signaling may be group common DCI for indicating the first spatial domain filter configuration information for a group of UEs. In another example, the at least one signaling may be at least one RRC signaling, MAC CE or other semi-static signaling for a specific UE. When there is more than one signaling, the type of each signaling may be the same or different. For example, both a RRC signaling and MAC CE can be used for indicating the first spatial domain filter configuration information and first DMRS configuration information. By the group common signaling, e.g., group common DCI, or semi-static signaling(s), e.g., RRC signaling(s) and MAC CE etc., an IAB node can perform dynamic scheduling without always waiting for the configuration information of its parent link.

According to some embodiments of the present application, the first spatial domain filter configuration information may indicate at least one spatial domain filter, which may be a beam or a beam set including at least one beam, or a RS index or RS index set. For example, the first spatial domain filter configuration information may include at least one of CSI-RS resource index, SSB index and SRS resource index. For the indicated at least one spatial domain filter, a mapping between index and spatial domain filter (or RS index or RS set index) for the first link can be configured by at least one of RRC signaling(s) and MAC CE, so that the bits for spatial filter indication can be fixed.

FIG. 3 illustrates an exemplary mapping between index and spatial domain filter (or RS index or RS index set) according to some embodiments of the present application. Specifically, in FIG. 3, index #0 is associated with non zero power (NZP) CSI-RS #2; index #1 is associated with NZP CSI-RS #1 and NZP CSI-RS #3; index #2 is mapped to NZP CSI-RS #5, NZP CSI-RS #6 and NZP CSI-RS #7; and index #3 is mapped to SSB #8.

According to some other embodiments of the present application, the first spatial domain filter configuration information includes a first PMI index subset which includes one or more PMI index. The first PMI index subset is selected from a PMI set (also referred to as a codebook), which can be predefined, or may be configured by a RRC signaling or MAC CE. Similarly, a mapping between index and PMI may be: index #0 can be mapped to PMI #1, and index #1 can be mapped to PMI #5, PMI #7 and PMI #8, etc.

Regarding the first DMRS configuration information, it may include at least one of DMRS CDM group, at least one DMRS port index, and a number of frontloaded DMRS symbols. For example, the first DMRS configuration information may include a DMRS CDM group and a number of frontloaded DMRS symbols in some embodiments of the present application.

According to some embodiments of the present application, the DMRS CDM group is associated with downlink DMRS or uplink DMRS. For DMRS configuration type 1, there are at most two DMRS CDM groups; and for DMRS configuration type 2, there are at most three DMRS CDM groups. A DMRS CDM group may contain four resource elements in time and frequency domain, wherein frequency domain-orthogonal cover code (FD-OCC) and time domain-orthogonal cover code (TD-OCC) are adopted for the four resource elements. For example, CDM group #0 can be indicated from the parent node of an IAB node to the IAB node for the IAB node's parent link. In some other embodiments of the present application, CDM group #0 and CDM group #1 can be indicated to be used for the parent link. With the DMRS CDM group indication for the parent link, the IAB node can allocate the DMRS CDM group for its child link by avoiding the DMRS ports associated the parent link's DMRS CDM group. Meanwhile, the IAB node can avoid using the resource element(s) associated with the DMRS port(s) of the parent link for data transmission and reception on the child link. For example, CDM group #1 can be indicated from the parent node of an IAB node to the IAB node for the IAB node's child link. In some other embodiments of the present application, CDM group #1 and CDM group #2 can be indicated to be used for the child link. With the DMRS CDM group indication for the child link, the IAB node can allocate the DMRS CDM group for its child link accordingly.

In legacy 3GPP releases, the indication of number of frontloaded DMRS symbols is by two steps: configuring the max number of frontloaded DMRS symbols via RRC signaling, and indicating the actual number of frontloaded DMRS symbols via DCI. The max number of frontloaded DMRS symbols, it can be 1 or 2. When the max number of frontloaded DMRS symbols is "1," it means that at most one frontloaded symbol can be used for DMRS. Accordingly, only one frontloaded symbol can be further indicated by dynamic DCI for DMRS. When the max number of frontloaded DMRS symbols is "2," it means that at most two frontloaded symbols can be used for DMRS. Then, one or two frontloaded symbols can be configured by dynamic DCI for DMRS.

According to some embodiments of the present application, in an IAB network, the parent node of an IAB node may indicate the number of front-loaded DMRS symbols for the parent link or both the parent link and child link to the IAB node by semi-static signaling or group common DCI. The indicated number of front-loaded DMRS symbols will be used for both the parent link scheduled by the parent node and the child link scheduled by the IAB node. The indicated number of frontloaded DMRS symbols is the actual number used for DMRS transmission and/or reception. Alternatively, the parent node of an IAB node may also indicate the number of front-loaded DMRS symbols for the child link by semi-static signaling(s) or group common DCI.

Alternatively, in an IAB network, the parent node of an IAB node may indicate at least one DMRS port index for the parent link by semi-static signaling(s) or group common DCI. The indicated DMRS port index(es) will be used for both the parent link scheduled by the parent node. Alternatively, the parent node of an IAB node may also indicate at least one DMRS port index for the child link by semi-static signaling(s) or group common DCI, and the IAB node can perform scheduling on the child link accordingly.

In some embodiments of the present application, the at least one of first spatial domain filter configuration information and first DMRS configuration information is configured per CC or per BWP. That is, in frequency domain, each CC or BWP will have separate first spatial domain filter configuration information and/or first DMRS configuration information.

In time domain, there are two alternatives for resource allocation: one is, the received at least one of first spatial domain filter configuration information and first DMRS configuration information is effective until being updated by new received related configuration information; and the other is, the received at least one of first spatial domain filter configuration information and first DMRS configuration information is effective for at least one time domain resource. The time domain granularity of the time domain resource or the at least one time domain resource may be predefined or configured by a RRC signaling or a MAC CE. A unit of the time domain granularity or a unit of the time domain resource may be an absolute time value in some embodiments of the present application, e.g., in a unit of "ms" or "s" or "us" etc. In some other embodiments of the present application, a unit of the time domain granularity or a unit of the time domain resource may be a slot or a symbol with respect to a SCS. The SCS may be configured by a RRC signaling or a MAC CE, and is determined by BWP configuration when the at least one signaling for indicating resource allocation is received.

Figure 4:
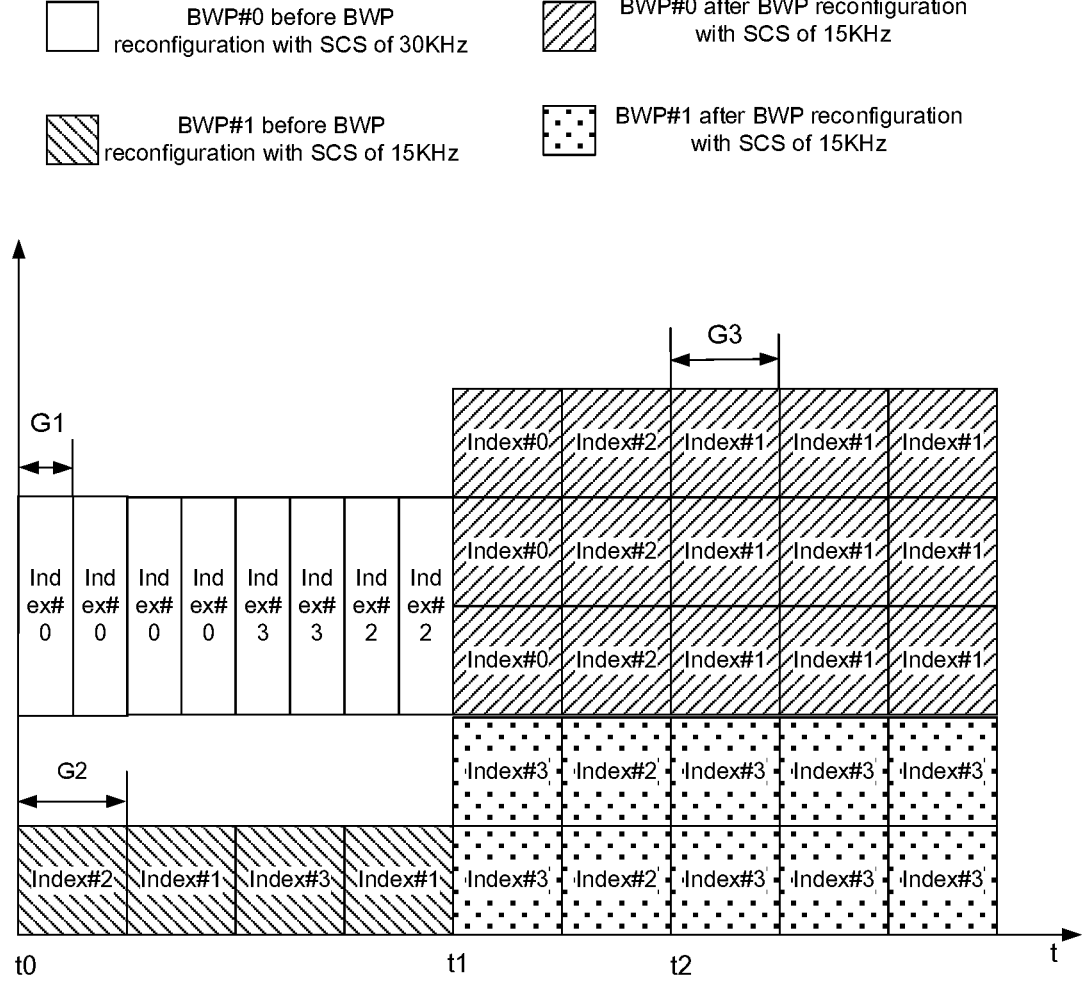
FIG. 4 illustrates an exemplary resource allocation with different time domain granularities according to some embodiments of the present application, which is based on the mapping between index and spatial domain filter (or RS index or RS index set) shown in FIG. 3.

FIG. 4 illustrates an exemplary resource allocation with different time domain granularities according to some embodiments of the present application, which is based on the mapping between index and spatial domain filter (or RS index or RS index set) shown in FIG. 3.

Specifically, as shown in FIG. 4, there are two BWPs, i.e., BWP #0 and BWP #1, wherein BPW #0 further includes BPW #0 before BWP reconfiguration with SCS of 30 KHZ and BWP #0 before BWP reconfiguration with SCS of 15 KHZ, and BWP #1 further includes BWP #1 before BWP reconfiguration with SCS of 15 KHZ and BWP #1 before BWP reconfiguration with SCS of 15 KHZ. A group common DCI is received at t0 firstly, and then a new group common DCI is received at t2. At t1, BWP reconfiguration with SCS of 15 KHZ for BWP #0 and BWP reconfiguration with SCS of 15 KHZ for BWP #1 are received respectively.

According to some embodiments of the present application, the unit of the time domain granularity or time domain resource is an absolute time value, e.g. "s," "ms," "us" etc. For example, it is assumed that the time domain granularity can be firstly configured as 1 ms and the number of time domain resources can be configured as 6 ms for BWP #0. Then, for BWP #0, considering a group common DCI reception at t0, the time domain granularity between t0 and t2 is 1 ms, and the number of indexes for indicating spatial domain filter configuration information or DMRS configuration information is 6 (6 ms/1 ms=6). Considering a group common DCI reception at t2, the time domain granularity after t2 for BWP #0 is 1 ms, and the number of indexes for indicating spatial domain filter configuration information or DMRS configuration information is 6 (6 ms/1 ms=6). In another example, for BWP #0, it is assumed that the time domain granularity between t0 and t2 is also 1 ms while the number of time domain resources is 8 ms instead of 6 ms, and then the number of indexes for indicating spatial domain filter configuration information or DMRS configuration information is 8 (8 ms/1 ms=8). Since 8 is larger than the number of time domain resources between group common DCI at t0 and t2, there are some overlapped time domain resources indicated by both group common DCI at t0 and t2, e.g. first 2 ms after t2. Accordingly, it is assumed that the indicated spatial domain filter configuration information or DMRS configuration information by both group common DCI at t0 and t2 are the same for the overlapped time domain resources. Similarly, for BWP #1, in an example, the time domain granularity is also configured as 1 ms and the number of time domain resources is configured as 6 ms. Then, the time domain granularity between t0 and t2 is 1 ms, and the number of indexes for indicating spatial domain filter configuration information or DMRS configuration information in the group common DCI at t2 is 6 (6 ms/1 ms=6). The time domain granularity after t2 is also 1 ms, and the number of indexes for indicating spatial domain filter configuration information or DMRS configuration information in group common DCI at t2 is 6 (6 ms/1 ms=6).

According to some embodiments of the present application, the unit of time domain granularity or time domain resource is slot or symbol. In an example, the SCS for determining the time domain granularity can be configured by at least one of RRC signaling and MAC CE or can be predefined to be 15 KHz, and the number of slot can be configured to be 1. For example, it is assumed that the number of time domain resources is configured as 6 ms for BWP #0. Then, for BWP #0, considering a group common DCI reception at t0, the time domain granularity between t0 and t2 is 1 ms (1 slot is 1 ms based on 15 KHz SCS), and the number of indexes for indicating spatial domain filter configuration information or DMRS configuration information is 6 (6 ms/1 ms=6). Considering a group common DCI reception at t2, the time domain granularity after t2 for BWP #0 is also 1 ms, and the number of indexes for indicating spatial domain filter configuration information or DMRS configuration information is 6 (6 ms/1 ms=6). In another example, it is assumed that the number of time domain resources is 8 ms and the time domain granularity between t0 and t2 is also 1 ms. Then the number of indexes for indicating spatial domain filter configuration information or DMRS configuration information is 8 (8 ms/1 ms=8). Since 8 is larger than the number of time domain resources between group common DCI at t0 and t2, there are some overlapped time domain resources indicated by both group common DCI in t0 and t2, e.g., first 2 ms after t2. It is assumed that the indicated spatial domain filter configuration information and the DMRS configuration information by both group common DCI at t0 and t2 are the same for the overlapped time domain resources. Similarly, for BWP #1, the number of time domain resources is configured to be 6 ms firstly. Then, the time domain granularity between t0 and t2 is 1 ms, and the number of indexes for indicating spatial domain filter configuration information or DMRS configuration information in group common DCI at t1 is 6 (6 ms/1 ms=6), the time domain granularity after t2 is also 1 ms, and the number of indexes for indicating spatial domain filter configuration information or DMRS configuration information in group common DCI at t2 is 6 (6 ms/1 ms=6).

When the unit of time domain granularity or time domain resource is slot or symbol while the SCS is implicitly determined by the associated BWP, the SCS is determined by the SCS of the corresponding BWP when the group common DCI is received. There may be BWP reconfiguration by a RRC signaling between two group common DCI receptions in time domain. However, the SCS for determining the time domain granularity will not change, so that the number of bits for indicating spatial domain filter can be the same. Accordingly, for BWP #0 at time t0, the reference SCS is 30 KHz (as BWP #0 is configured with SCS=30 KHz at t0), and the time domain granularity is configured to be 1 slot (1 slot=0.5 ms for 30 KHz SCS, e.g. G1 in FIG. 4). For BWP #1 at time t0, the reference SCS is 15 KHz, and the time domain granularity is configured to be 1 slots (1 slots=1 ms for 15 KHz SCS, e.g. G2 in FIG. 4). For BWP #0 at time t1, although the SCS of BWP #0 is changed to be 30 KHz by BWP reconfiguration, the time domain granularity keeps the same (e.g. 0.5 ms) because there is no new group common DCI reception. For BWP #1 at time t1, the SCS is still 15 KHz even with BWP reconfiguration, and the time domain granularity is determined by the SCS at t0 with group common DCI reception, so the time domain granularity is still 1 ms (1 slot=1 ms for 15 KHz). For BWP #0 at time t2, a new group common DCI is received, and the SCS of BWP #0 is 15 KHz because it is changed by the BWP reconfiguration previously. If the time domain granularity is still 1 slot, then it corresponds to 1 ms, e.g. G3. For BWP #1 at t2, a new group common DCI is received, and the SCS of BWP #1 is 15 KHz. If the time domain granularity is still 1 slot, then it corresponds to 1 ms, e.g. G3. If the number of time domain resources is 6 ms, then the number of indexes for indicating spatial domain filter configuration information (or spatial domain filter, or resource) or DMRS configuration information in the group common DCI received at t0 for BWP #0 is 6 (6=6 ms/1 slot=6 ms/0.5 ms for 30 KHz SCS), and the number of indexes for indicating spatial domain filter configuration information or DMRS configuration information in the group common DCI received at t1 for BWP #0 is 6 (6=6 ms/1 slot=6 ms/1 ms for 15 KHz SCS). If the number of time domain resources is 6 ms, then the number of indexes for indicating spatial domain filter configuration information or DMRS configuration information in the group common DCI received at t0 for BWP #1 is 6 (6=6 ms/1 slot=6 ms/1 ms for 15 KHz SCS), and the number of indexes for indicating spatial domain filter configuration information or DMRS configuration information in the group common DCI received at t1 for BWP #1 is 6 (6=6 ms/1 slot=6 ms/1 ms for 15 KHz SCS).

Returning FIG. 2, in step 203, data on a second link of the second node is received or transmitted, e.g., in the second node. The first link is the same as or different from the second link, that is, the second link can also be a link between the first node and second node, or a link between the second node and a third node different the first node. When the first link is different from the second link, the method may further include at least one of: determining second spatial domain filter configuration information for the second link of the second node based on the first spatial domain filter configuration information, and determining second DMRS configuration information for the second link based on the first DMRS configuration information. Based on the first spatial domain filter configuration information and first DMRS configuration information, the second node can transmit and receive data on the link between the first node and the second node. Based on the second spatial domain filter configuration information and second DMRS configuration information, the second node can transmit and receive data on the link between the second node and the third node.

For example, when the first link is different from the second link, the second node may configure the second spatial domain filter configuration information and second DMRS configuration information for the second link based on the first spatial domain filter configuration information and first DMRS configuration information for the first link. For example, the second spatial domain filter can be configured so that signals can be transmitted or received simultaneously at the second node's parent link and child link. Alternatively, the second spatial domain filter can be configured as the first spatial domain filter. For DMRS configuration, the number of frontloaded symbols for the second link can be configured the same as that of the first link. For DMRS configuration, with DMRS configuration #1 in TS 38.211, if CDM group #0 is indicated for the first link, then CDM #1 can be indicated for the second link. For DMRS configuration, with DMRS configuration #2 in TS 38.211, if CDM group #0 and CDM group #1 are indicated for the first link, then DMRS CDM group #2 can be used for the second link.

In an IAB network, the parent node of an IAB node may configure the configuration information for the parent link, i.e., the first spatial domain filter configuration information and DMRS configuration information for the parent link of the IAB node. The IAB node may configure the second spatial domain filter configuration information and second DMRS configuration information for the child link of the IAB node. In some other embodiments of the present application, the parent node of an IAB node may configure the configuration information for the child link, i.e., the first spatial domain filter configuration information and DMRS configuration information for the child link of the IAB node. The IAB node may determine the second spatial domain filter configuration information and second DMRS configuration information for the child link of the IAB node based on the received configuration information for the child link. Alternatively, the IAB node may also determine the second spatial domain filter configuration information and second DMRS configuration information for the parent link of the IAB node based on the received configuration information for the child link. Based on the spatial domain filter configuration information and DMRS configuration information for the parent link, the IAB node can transmit and receive data on the parent link. Based on the spatial domain filter configuration information and DMRS configuration information for the child link, the IAB node can transmit and receive data on the child link.

Embodiments of the present application also illustrate a procedure associated with resource allocation in the first node side, e.g., in the parent node (or an DU of the parent node) of an IAB node or the like. For example, FIG. 5 is a flow chart illustrating an exemplary method for resource allocation according to some other embodiments of the present application. Considering the consistency between the first node side and second node side, the exemplary procedure in the first node side will be briefly illustrated.

As shown in FIG. 5, in step 501, at least one signaling indicating at least one of first spatial domain filter configuration information and first DMRS configuration information for a first link of a second node is transmitted from a first node, e.g., to a second node. In some embodiments of the present application, a first node may configure the first spatial domain filter configuration information and first DMRS configuration information for the first link of the second node. The first node may be a parent node (or the DU of the parent node) of the second node (or the MT of the second node). The first link of the second node is a link between the first node and the second node or a link between the second node with a third node (or the MT of the third node). The third node may be the child node of the second node. In some embodiments of the present application, the first node may also configure the second spatial domain filter configuration information and second DMRS configuration information for the link between the second node and the third node.

In some embodiments of the present application, the at least one signaling is at least one group common DCI, at least one RRC signaling, at least one MAC CE, at least one semi-static signaling, or a signaling combination of two or more of these signaling. For example, the at least one signaling may be group common DCI for indicating the first spatial domain filter configuration information for a group of UEs. In another example, the at least one signaling may be at least one RRC signaling, MAC CE or semi-static signaling for a specific UE.

According to some embodiments of the present application, the first spatial domain filter configuration information may indicate at least one spatial domain filter, which may be a beam or a beam set, or a RS index or RS index set. For example, the first spatial domain filter configuration information may include at least one of CSI-RS resource index, SSB index and SRS resource index. For the indicated spatial domain filter, a mapping between index and spatial domain filter for the first link can be configured by at least one of RRC signaling(s) and MAC CE, so that the bits for spatial domain filter set indication can be fixed.

According to some other embodiments of the present application, the first spatial domain filter configuration information includes a first PMI index subset including one or more PMI index. The first PMI index subset is selected from a PMI set (also referred to as a codebook) predefined, or may be configured by a RRC signaling or MAC CE.

Regarding the first DMRS configuration information, it may include at least one of DMRS CDM group, at least one DMRS port index, and a number of frontloaded DMRS symbols. The DMRS CDM group may be associated with downlink DMRS or uplink DMRS. For DMRS configuration type 1, there are two DMRS CDM groups; and for DMRS configuration type 2, there are three DMRS CDM groups. A DMRS CDM group may contain four resource elements in time and frequency domain, and FD-OCC and TD-OCC are adopted for the four resource elements.

Regarding the number of frontloaded DMRS symbols, it can be 1 or 2. In an IAB network, the parent node of an IAB node may indicate the number of front-loaded DMRS symbols for the parent link or both the parent link and child link to the IAB node by semi-static signaling or group common DCI. The indicated number of front-loaded DMRS symbols will be used for both the parent link scheduled by the parent node and the child link scheduled by the IAB node. The indicated number of frontloaded DMRS symbols is the actual number used for DMRS transmission and/or reception. Alternatively, the parent node of an IAB node may also indicate the number of front-loaded DMRS symbols for the child link by semi-static signaling(s) or group common DCI.

In frequency domain, the at least one of first spatial domain filter configuration information and first DMRS configuration information is configured per CC or per BWP. In time domain, there are two alternatives for resource allocation: one is, the received at least one of first spatial domain filter configuration information and first DMRS configuration information is effective until being updated by new received related configuration information; and the other is, the received at least one of first spatial domain filter configuration information and first DMRS configuration information is effective for at least one time domain resource. The time domain granularity of the time domain resource or the at least one time domain resource may be predefined or configured by a RRC signaling or a MAC CE. A unit of the time domain granularity or a unit of the time domain resource is an absolute time value, e.g., in a unit of "ms" or "s" or "us" etc. in some embodiments of the present application; while a unit of the time domain granularity or a unit of the time domain resource is a slot or a symbol with respect to a SCS in some other embodiments. The SCS may be configured by a RRC signaling or a MAC CE, and is determined by BWP configuration when the signaling is received.

In step 503, data on a second link of the second node is transmitted or received, e.g., in the first node, wherein, the first link is the same as or different from the second link.

In an IAB network, the first node is the parent node (or DU of the parent node) of an IAB node (i.e., the second node), and the second link is a link between the first node and the second node. When the parent node configures the resource for the child link of the IAB node, the first link is a link between the first node and a third node and the first link is different from the second link between the first node and the second node, e.g. the third node is the second node's child node. The first node may determine second spatial domain filter configuration information for the second link, i.e., the parent link of the second node based on the first spatial domain filter configuration information, and determine second DMRS configuration information for the second link based on the first DMRS configuration information. When the first link is the same as the second link, the second node may determine at least one of spatial domain filter configuration information and DMRS configuration information for the for the second node's child node, i.e., the child link of the second node based on at least one of the first spatial domain filter configuration information and the first DMRS configuration information.

Based on the second spatial domain filter configuration information and second DMRS configuration information, the first node can transmit and receive data on the link between the first node and the second node. Persons skilled in the art shall know well that: in the first node, determining the second spatial domain filter configuration information for the second link of the second node based on the first spatial domain filter configuration information is only for illustrating the determination of the first and second spatial domain filter configuration information are associated, which should not be deemed as a determination sequence. It is the same for determining the second DMRS configuration information for the second link based on the first DMRS configuration information in the first node. The first node may configure the resource allocation information both for the first link and second link of the second node while only indicate the configuration information for first link or second link to the second node. Meanwhile, as stated above, the second spatial domain filter configuration information and second DMRS configuration information can be configured in the same or similar manner as the first spatial domain filter configuration information, and thus will not repeat.

In addition, embodiments of the present application also propose an apparatus for resource allocation. For example, FIG. 6 illustrates a block diagram of an apparatus 600 for resource allocation according to some embodiments of the present application.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be an IAB node apparatus (e.g., the MT of an IAB node) configured to perform a method illustrated in FIG. 2 and the like, or a parent node of the IAB node (e.g., the DU of the parent node) configured to perform a method illustrated in FIG. 5 or the like.

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 can be combined into a single device, such as a transceiver. In certain embodiments of the present application, the apparatus 600 may further include an input device, a memory, and/or other components.

For example, in some embodiments of the present application, the non-transitory computer-readable medium 601 may have stored thereon computer-executable instructions to cause a processor to implement the method with respect to the IAB node as described above. For example, the computer-executable instructions, when executed, cause the processor 606 interacting with receiving circuitry 602 and transmitting circuitry 604, so as to perform the steps with respect to the second node depicted in FIG. 2.

In some embodiments of the present application, the non-transitory computer-readable medium 601 may have stored thereon computer-executable instructions to cause a processor to implement the method with respect to the parent node as described above. For example, the computer-executable instructions, when executed, cause the processor 606 interacting with receiving circuitry 602 and transmitting circuitry 604, so as to perform the steps with respect to the first node depicted in FIG. 5.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus including a processor and a memory. Computer programmable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method, comprising:

receiving, from a first node, at least one signaling indicating one or both of first spatial domain filter configuration information and first demodulation reference signal (DMRS) configuration information for a first link of a second node; and receiving or transmitting data on a second link of the second node, wherein the first link is the same as or different from the second link, and wherein the first spatial domain filter configuration is for at least one time domain resource, and a time domain granularity of the at least one time domain resource is configured by a radio resource control (RRC) signaling.

2. The method of claim 1, wherein the at least one signaling is at least one of: group common downlink link control (DCI), or semi-static signaling(s).

3. The method of claim 1, wherein the first DMRS configuration information comprises at least one of DMRS code division multiplexing (CDM) group, at least one DMRS port index, and a number of frontloaded DMRS symbols.

4. The method of claim 1, wherein the first link or the second link is a link between the first node and the second node.

5. The method of claim 1, wherein the first link or the second link is a link between the second node and a third node different from the first node.

6. The method of claim 1, wherein the first link is different from the second link, and the method comprises one or both of:

determining second spatial domain filter configuration information for the second link of the second node based on the first spatial domain filter configuration information; and determining second DMRS configuration information for the second link based on the first DMRS configuration information.

7. The method of claim 1, wherein the first spatial domain filter configuration information comprises a channel state information-reference signal (CSI-RS) resource index, a synchronization signal block (SSB) index, a sounding reference signal (SRS) resource index, or a combination thereof.

8. The method of claim 1, wherein the first spatial domain filter configuration information comprises a first precoding matrix indicator (PMI) index subset including a PMI index.

9. The method of claim 8, wherein the first PMI index subset is selected from a PMI set predefined or configured by a radio resource control (RRC) signaling or a medium access control (MAC) control element (CE).

10. The method of claim 1, wherein the one or both of first spatial domain filter configuration information and first DMRS configuration information is configured per carrier component (CC) or per bandwidth part (BWP).

11. The method of claim 1, wherein a unit of the time domain granularity or a unit of the time domain resource is an absolute value.

12. The method of claim 1, wherein a unit of the time domain granularity or a unit of the time domain resource is a slot or a symbol with respect to a subcarrier spacing (SCS).

13. The method of claim 12, wherein the SCS is configured by a radio resource control (RRC) signaling, or a medium access control (MAC) control element (CE).

14. A first node, comprising:

at least one memory; and at least one processor coupled with the at least one memory and configured to cause the first node to:

receive, from a first node, at least one signaling indicating one or both of first spatial domain filter configuration information and first demodulation reference signal (DMRS) configuration information for a first link of a second node; and receive or transmitting data on a second link of the second node, wherein the first link is the same as or different from the second link, and wherein the first spatial domain filter configuration is for at least one time domain resource, and a time domain granularity of the at least one time domain resource is configured by a radio resource control (RRC) signaling.

15. The first node of claim 14, wherein the at least one signaling is at least one of: group common downlink link control (DCI), or semi-static signaling(s).

16. The first node of claim 14, wherein the first DMRS configuration information comprises at least one of DMRS code division multiplexing (CDM) group, at least one DMRS port index, and a number of frontloaded DMRS symbols.

17. The first node of claim 14, wherein the first link or the second link is a link between the first node and the second node.

18. The first node of claim 14, wherein the first link or the second link is a link between the second node and a third node different from the first node.

19. A processor for wireless communication, comprising:

at least one controller coupled with at least one memory and configured to cause the processor to:

receive, from a first node, at least one signaling indicating one or both of first spatial domain filter configuration information and first demodulation reference signal (DMRS) configuration information for a first link of a second node; and receive or transmitting data on a second link of the second node, wherein the first link is the same as or different from the second link, and wherein the first spatial domain filter configuration is for at least one time domain resource, and a time domain granularity of the at least one time domain resource is configured by a radio resource control (RRC) signaling.

* * * * *